Oct. 28, 1969  P. O. STRANDELL  3,474,518
STRIP WELDING ELECTRODE AND A METHOD FOR MAKING THE SAME
Filed Feb. 6, 1967
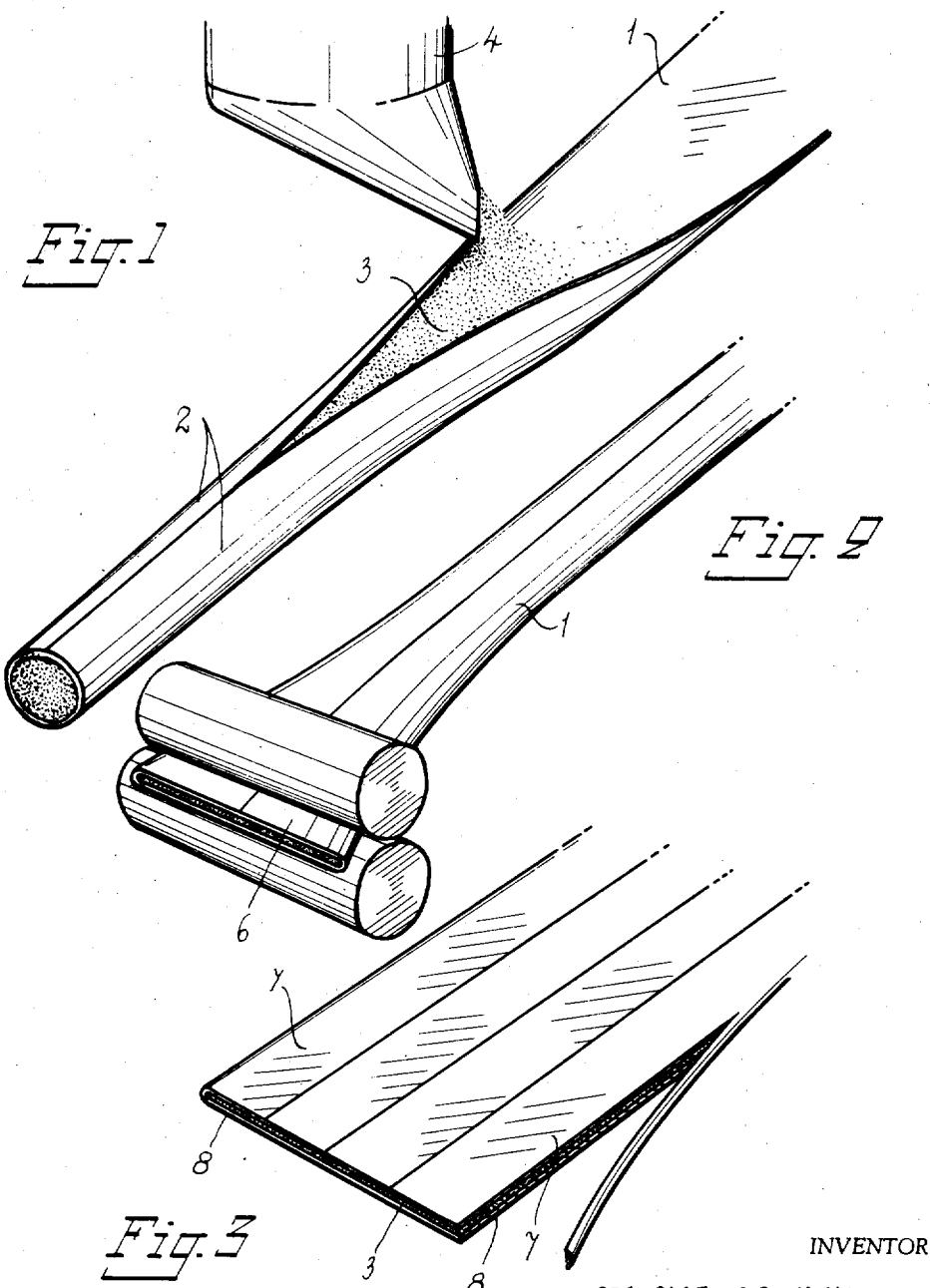
INVENTOR
PER OLOF STRANDELL
BY Stevens, Davis, Miller & Mosher
ATTORNEYS

United States Patent Office 3,474,518
Patented Oct. 28, 1969

3,474,518
STRIP WELDING ELECTRODE AND A METHOD FOR MAKING THE SAME
Per Olof Strandell, Bockstigen 3, Nasby Park, Sweden
Filed Feb. 6, 1967, Ser. No. 614,238
Claims priority, application Sweden, Feb. 15, 1966,
1,929/66
Int. Cl. B23p *17/00, 19/00*
U.S. Cl. 29—429          4 Claims

ABSTRACT OF THE DISCLOSURE

A method of manufacturing a consumable, thin walled, strip welding electrode, comprising bending a flat strip into tubular form, filling the tube with filler material, closing the tube along its length and flattening the filled tube to the required thickness.

BACKGROUND

The majority of semi and fully automatic welding methods include the step of passing a current through a consumable electrode which forms the weld deposit. Consequently, the composition of the weld electrode must be compatible with that of the base material and this results in a large number of electrodes of varying chemical analysis being used.

Solid type electrodes or fillers present a considerable disadvantage when working with new materials since it is necessary to follow the long path from the furnaces of the foundry to the finished product in order to produce electrodes which are compatible with the said new materials. The result of this inconvenience is that electrodes are often used whose analysis is not optimally adapted to that of the base material, or to the conditions under which welding is effected. A further disadvantage with solid electrodes is that their deposition rate is relatively low with respect to electrodes filled with a filler material when welding is effected under equivalent conditions.

An advance has been made, through the medium of the so-called tubular wire, toward solving the difficulties caused by variations in chemical analysis and welding properties. The tubular wire electrode is produced by filling a tube with a filler material the composition of which has been adapted to suit the base material, and then *drawing* the filled tube down to small dimensions.

One disadvantage with this method, however, is that it is necessary to use tubes having relatively thick walls for reasons of material strength; this means that the amount of powder which can be introduced into the tube is restricted and constitutes less than half of the electrode mass. Another disadvantage is that electrodes of this type do not permit a weld bead which is as wide as is sometimes desired.

It is at times desirable, especially when surfacing to use a type of electrode which gives a high deposition rate, minimum penetration and a wide weld bead.

The aforementioned disadvantages are overcome by means of the electrode according to the present invention. The electrode according to the invention also possesses the features of a high deposition rate, minimum penetration effect and a broad weld bead, the strips electrode claimed having, in comparison with a circular electrode, a wider jacket area with the same cross-sectional area and consequently a less concentrated arc. The strip design also facilitates the supply of current. The width of the weld bead can be varied by selection of the width of the strip electrode or by positioning the strip at various angles to the direction in which the weld is effected.

The present invention relates to a strip electrode and a method for making the same. The term "electrode" is meant to include all electrodes, whether current conducting or not.

The method according to the invention is mainly characterized by the steps of bending a flat strip into tubular form, filling the tube with a filler material, closing the tube along its length and flattening the tube to the required thickness.

Flattening is effected under compression forces and consequently tubes of very small wall thickness can be used. Thus it is possible to obtain an electrode filled with a filler material whereby the filler comprises a large percentage of the total mass. This offers several advantages as opposed to the electrodes produced in accordance with conventional methods. The large percentage of filler material means that the cooling effect of the filler increases, e.g. the temperature of the melt decreases, offering metallurgical advantages which give a higher quality in the case of weld joints and less blending of the weld deposit with the base material when surfacing. Since the steel casing comprises only a small portion of the total electrode mass it is possible to use casings made from the same composition, suitably low carbon steel. The analysis of the electrode can then easily be varied by variation of the composition of the filler. This implies a considerably more efficient electrode and a reduction in the price of manufacture since, as previously mentioned, the composition of the filler material can be easily varied by mixing desired constituents.

The invention will be more closely described with reference to the accompanying drawing which shows diagrammatically the manner in which the present welding electrode is produced according to one embodiment of the invention.

In the drawing FIGURE 1 shows in perspective the manner in which a strip is formed into a closed tube and how the formed tube is filled with a filler material before being closed along its length. FIGURE 2 shows in perspective the manner in which the tube is flattened into a flat strip. FIGURE 3 shows, also in perspective, the manner in which the strip formed according to FIGURE 2 is divided up into separate electrodes of narrower width.

DETAILED DESCRIPTION OF THE INVENTION

As can be seen from FIGURE 1, an initially flat strip is bent in any conventional and known manner to form a tube 2, closed along its length. The forming of the tube is advantageously effected in a sectional rolling mill which is so well known in the art that it will not be shown nor described herein except to the extent necessary in defining the invention to those skilled in the art.

The tube 2 is filled with a filler material 3 from a container 4 positioned above the tube. The tube is then closed along its length, preferably in the last pair of rolls of said rolling mill, the filler material being compacted to a suitable extent.

Tube 2 is then rolled flat between calibrated and smooth rolls 5, down to the required thickness. The width of the electrode is substantially increased during the flat rolling process.

The flat rolled strip 6 can be used immediately as a welding electrode. The desired width of the electrode is obtained by selecting the strip width and the diameter of the tube.

A more rational method is to produce flat rolled tubes according to the above described method with relatively wide width and then with suitable means cut the strips in a slitting line along the tube length into narrower strips of the required width (see FIGURE 3).

It is thus necessary when flattening the tube to reduce the same such an extent that a pressure weld is obtained and the two outer plate strips 7 and 8 are held together by the intermediate filler 3. The filler thus comprises a porous but fused mass.

This pressure welding effect can be facilitated by carrying out at least the last pass through the mill at an elevated temperature. A suitable temperature range with respect to certain additives is 500 to 600° C.

The method is fully continuous since the strips can be joined by butt-welding and the flat-rolled product coiled and clipped off to the required weight. The manufacture of shorter lengths can be effected in a conventional manner by using commercial tubes filled with filler material, after which the ends are sealed and the tubes flattened to form a strip.

What is claimed is:

1. A method for the continuous manufacture of welding electrodes and comprising the steps of filling a substantially flat strip of metal with a filler material; bending said strip around said filler material to form a closed tube enclosing said filler material; and passing said closed tube between smooth rolls so as to cause the unrestricted spread of the tube in the direction of the roll axis and in the direction of its own length, thus producing a completely flat electrode having a tube thickness of minimum size with regard to its function of encasing, the filler conducting the welding current without deleteriously influencing the weld.

2. The method as defied in claim 1 and further comprising the step of pressure welding said closed tube.

3. The method of claim 1 and further comprising the step of slitting said flat electrode so as to form a plurality of narrower electrodes.

4. The method of claim 3 and further comprising the step of winding said narrower electrodes onto a storage drum.

References Cited

UNITED STATES PATENTS

| 1,131,037 | 3/1915 | Cary | 29—411 |
| 1,406,542 | 2/1922 | Crocker | 29—25.18 |
| 1,629,748 | 5/1927 | Stoody | 219—146 |
| 2,493,143 | 1/1950 | Ingels. | |
| 2,565,477 | 8/1951 | Crowell et al. | |
| 2,607,109 | 8/1952 | Reynolds | 29—411 |

THOMAS H. EAGER, Primary Examiner

U.S. Cl. X.R.

29—25.18, 202.5, 400, 411; 219—146